(12) United States Patent
Hudson

(10) Patent No.: US 11,486,307 B2
(45) Date of Patent: Nov. 1, 2022

(54) AIRCRAFT COMPRISING A GAS TURBINE ENGINE HAVING AN AXIALLY ADJUSTABLE INTAKE AND A NACELLE

(71) Applicant: Rolls-Royce Deutschland Ltd & Co KG, Blankenfelde-Mahlow (DE)

(72) Inventor: Thomas Oliver Hudson, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 304 days.

(21) Appl. No.: 16/719,096

(22) Filed: Dec. 18, 2019

(65) Prior Publication Data

US 2021/0189959 A1   Jun. 24, 2021

(51) Int. Cl.
| | |
|---|---|
| *F02C 7/042* | (2006.01) |
| *B64D 29/04* | (2006.01) |
| *B64D 33/02* | (2006.01) |
| *B64D 27/14* | (2006.01) |
| *B64C 30/00* | (2006.01) |
| *B64D 27/20* | (2006.01) |

(52) U.S. Cl.
CPC .............. *F02C 7/042* (2013.01); *B64C 30/00* (2013.01); *B64D 27/14* (2013.01); *B64D 27/20* (2013.01); *B64D 29/04* (2013.01); *B64D 33/02* (2013.01); *B64D 2033/026* (2013.01); *B64D 2033/0273* (2013.01)

(58) Field of Classification Search
CPC ............ B64D 27/08; B64D 2033/0273; B64D 27/14; B64D 27/20; B64D 29/04; B64D 33/02; F02C 7/042
USPC ......................................................... 244/54
See application file for complete search history.

(56) References Cited

U.S. PATENT DOCUMENTS

| | | | |
|---|---|---|---|
| 6,340,135 B1 * | 1/2002 | Barton ................... | B64D 29/00 244/53 B |
| 2010/0148012 A1 * | 6/2010 | McDonough .......... | B64D 29/00 244/53 B |
| 2011/0219783 A1 * | 9/2011 | Joret ...................... | B64D 29/08 60/796 |
| 2016/0040595 A1 | 2/2016 | Devine | |
| 2017/0158341 A1 * | 6/2017 | Kawai ....................... | F02K 3/06 |
| 2017/0283081 A1 * | 10/2017 | Kestler .................. | B64D 27/16 |

FOREIGN PATENT DOCUMENTS

| | | |
|---|---|---|
| EP | 3176092 A1 | 6/2017 |
| WO | 2005065071 A2 | 7/2005 |

OTHER PUBLICATIONS

L. da Rocha-Schmidt, et al, "Progress Towards Adaptive Aircraft Engine Nacelles", Sep. 7-14, 2014.

* cited by examiner

*Primary Examiner* — Brady W Frazier
(74) *Attorney, Agent, or Firm* — Shuttleworth & Ingersoll, PLC; Timothy Klima

(57) ABSTRACT

Aspects of the invention regard an aircraft including: a gas turbine engine, the gas turbine engine including an intake, a nacelle, and gas turbine engine components located radially inside the nacelle; and an aircraft structure. The intake of the gas turbine engine is mounted to the aircraft structure in a manner such that its position can be adjusted. The nacelle and the gas turbine engine components located radially inside the nacelle are rigidly mounted to the aircraft structure. Other aspects of the invention regard a gas turbine engine and a method for adjusting the input of air flowing into a gas turbine engine.

12 Claims, 5 Drawing Sheets

AIRCRAFT COMPRISING A GAS TURBINE ENGINE HAVING AN AXIALLY ADJUSTABLE INTAKE AND A NACELLE

The present disclosure relates an aircraft that comprises a gas turbine engine having an intake and a nacelle.

The intake of a gas turbine engine, also referred to as engine intake or nacelle intake, serves to guide air into the fan of the gas turbine engine and around the nacelle body. The intake is typically rigidly mounted to the fan casing of the gas turbine engine. However, for certain subsonic, trans-sonic or supersonic flight regimes, a variable geometry intake is required. A variable geometry intake enables the amount of air entering the fan to be adjusted, depending on the flight condition.

To this end, it is known to provide translating intakes that allow to realize a variable throat area and profile of the intake. In such case, the intake is not a fixed part of the nacelle. Rather, the intake is movable relative to the nacelle. Such variable systems require additional components to manage the configuration change, such as actuators, guide rails and flaps. These components need an installation space which typically increases the cross-sectional area of the intake. However, the intake cross-sectional area has a considerable impact on the drag of the aircraft and influences fuel consumption and range.

Accordingly, there is a need to provide for a translating intake which has favorable aerodynamic properties, in particular a relatively small cross-sectional area.

According to an aspect of the invention, an aircraft is provided which comprises a gas turbine engine, wherein the gas turbine engine comprises an intake, a nacelle, and gas turbine engine components located radially inside the nacelle. The aircraft further comprises an aircraft structure. It is provided that the intake of the gas turbine engine is mounted to the aircraft structure in a manner such that its position can be adjusted. At the same time, the nacelle and the gas turbine engine components located radially inside the nacelle are rigidly mounted to the aircraft structure.

Accordingly, aspects of the present invention are based on the idea to mount only the nacelle and gas turbine engine components located radially inside the nacelle rigidly to the aircraft structure, while the intake is mounted to the aircraft structure in a manner such that its position can be adjusted (in a slidable manner), without being directly connected to the nacelle or structures of or inside the nacelle. This allows the locating of an actuator that moves the intake along the aircraft structure as well as associated mounting components inside the aircraft, such that the physical space claim within the intake and nacelle structures is reduced. This creates the possibility to design a low-drag slim line intake and nacelle. Such a low-drag slim line intake and nacelle may be particularly beneficial during supersonic flight, but may be beneficial in other flight conditions as well. Accordingly, aspects of the present invention allow the implementing of a low-drag slim line intake and nacelle that may lead to a reduction in fuel consumption and increase in aircraft range.

According to an embodiment, the intake is movable between a stowed position in which the intake is located adjacent the nacelle, and a deployed position in which the intake is located at an axial distance to the nacelle, wherein in the deployed position an axial gap is present between the nacelle and the intake. When an axial gap is present, additional air is provided to the fan.

The position of the intake may depend on the velocity of the aircraft. For example, the aircraft may be configured to move the intake into the deployed position during takeoff and at lower speeds of the aircraft, e.g., until the speed of the aircraft reaches a sufficient Mach number such that the deployed position is no longer required. In other words, at lower velocities of the aircraft an axial gap is provided that allows additional air to stream into the fan.

In an embodiment, the intake and the nacelle comprise corresponding structures at their end faces that face each other wherein, in the stowed position, the intake and the nacelle create a consistent aerodynamic surface. In other words, the mating face of the translating intake and the profile of the nacelle match to provide for a smooth surface in the stowed position.

In an embodiment, the intake is movable to at least one intermediate position located between the stowed position and the deployed position. According to this embodiment, the axial gap between the intake and the nacelle may be set to a desired value such that the amount of air provided to the fan can be controlled.

To mount the intake of the gas turbine engine to the aircraft structure in a manner such that its position can be adjusted, an actuating mechanism is provided that comprises at least one actuator and a sliding mechanism. The intake is connected to the sliding mechanism, wherein the sliding mechanism can be moved in the forwards and rearwards axial direction by means of the actuator. Alternatively, the intake is connected to the actuator when the actuator can be moved relative to the sliding mechanism. The actuator and the sliding mechanism may form, in an embodiment, a rack-and-pinion system. The actuator and the sliding mechanism are configured to move the intake between the stowed position and the deployed position and, if required, intermediate positions.

The actuating mechanism may be a linear actuating mechanism moving the sliding mechanism and the intake in a linear motion.

In an embodiment, the actuator and the sliding mechanism are attached to the aircraft structure. By providing the actuator and the sliding mechanism in or at the aircraft structure, the actuator and the sliding mechanism do not need to be located in the intake or the nacelle, such that the intake and nacelle can be designed in a slim, aerodynamically favorable manner.

In an embodiment, the intake is connected at a minimum of two mounting positions to the sliding mechanism. This provides for an improved mechanical connection and avoids tilting of the intake.

In a further embodiment, the sliding mechanism comprises at least one guidance rail that can be moved relative to the aircraft structure, wherein the intake is connected to the guidance rail and wherein the guidance rail is driven by an actuator. For example, the sliding mechanism comprises two guidance rails that are arranged parallel to each other and that both can be moved relative to the aircraft structure by means of the actuator, wherein the intake is connected to both guidance rails.

The gas turbine engine comprises a central axis, wherein the intake can be moved with respect to the nacelle in the forward and rearward axial direction.

The aircraft structure to which the intake is mounted in a manner such that its position can be adjusted can be any structure of the aircraft to which the gas turbine engine can be mounted. In an embodiment, the aircraft structure to which the intake is mounted in a manner such that its position can be adjusted is within the fuselage of the aircraft, in particular the rear of the fuselage.

The components of the gas turbine engine located radially inside the nacelle may comprise a fan and an engine core located downstream of the fan. The gas turbine engine may be a turbofan engine comprising a primary duct guiding a core airflow through the engine core and a bypass duct.

According to a further aspect of the invention, a gas turbine engine is provided which comprises:

an intake, a nacelle, and gas turbine engine components located radially inside the nacelle;

wherein the intake of the gas turbine engine is configured to be mounted to an aircraft structure in a manner such that its position can be adjusted;

wherein the nacelle and the gas turbine engine components located radially inside the nacelle are configured to be rigidly mounted to the aircraft structure.

In an embodiment, the intake is configured to be movable between a stowed position in which the intake is located adjacent the nacelle and a deployed position in which the intake is located at an axial distance to the nacelle, wherein in the deployed position an axial gap is present between the nacelle and the intake.

In a further embodiment, the intake is configured to be connected to a sliding mechanism that can be moved relative to the aircraft structure by means of an actuator.

According to a still further aspect of the invention, a method for adjusting the input of air flowing into a gas turbine engine attached to an aircraft is provided, the method comprising:

connecting an intake of the gas turbine engine to an aircraft structure in a manner that allows it to be moved from one position to another;

connecting a nacelle and gas turbine engine components located radially inside the nacelle in a rigid manner to the aircraft structure;

adjusting the axial distance between the intake and the nacelle by moving the intake relative to the aircraft structure.

In an embodiment of the method, adjusting the axial distance comprises moving the intake between a stowed position in which the intake is located adjacent the nacelle and a deployed position in which the intake is located at an axial distance to the nacelle depending on the speed of the aircraft. The intake may be moved in the deployed position at lower speeds of the aircraft and moved into the stowed position at higher speeds of the aircraft.

It should be noted that the present invention is described in terms of a cylindrical coordinate system having the coordinates x, r and φ. Here x indicates the axial direction, r the radial direction and φ the angle in the circumferential direction. The axial direction is defined by the machine axis of the gas turbine engine, with the axial direction pointing from the engine inlet to the engine outlet. This axial direction of the gas turbine engine is parallel to the axial direction of the aircraft to which the gas turbine engine is mounted. Starting from the x-axis, the radial direction points radially outwards. Terms such as "in front of" and "behind" refer to the axial direction or flow direction in the engine. Terms such as "outer" or "inner" refer to the radial direction.

The invention will be explained in more detail on the basis of exemplary embodiments with reference to the accompanying drawings in which.

Figure 1:
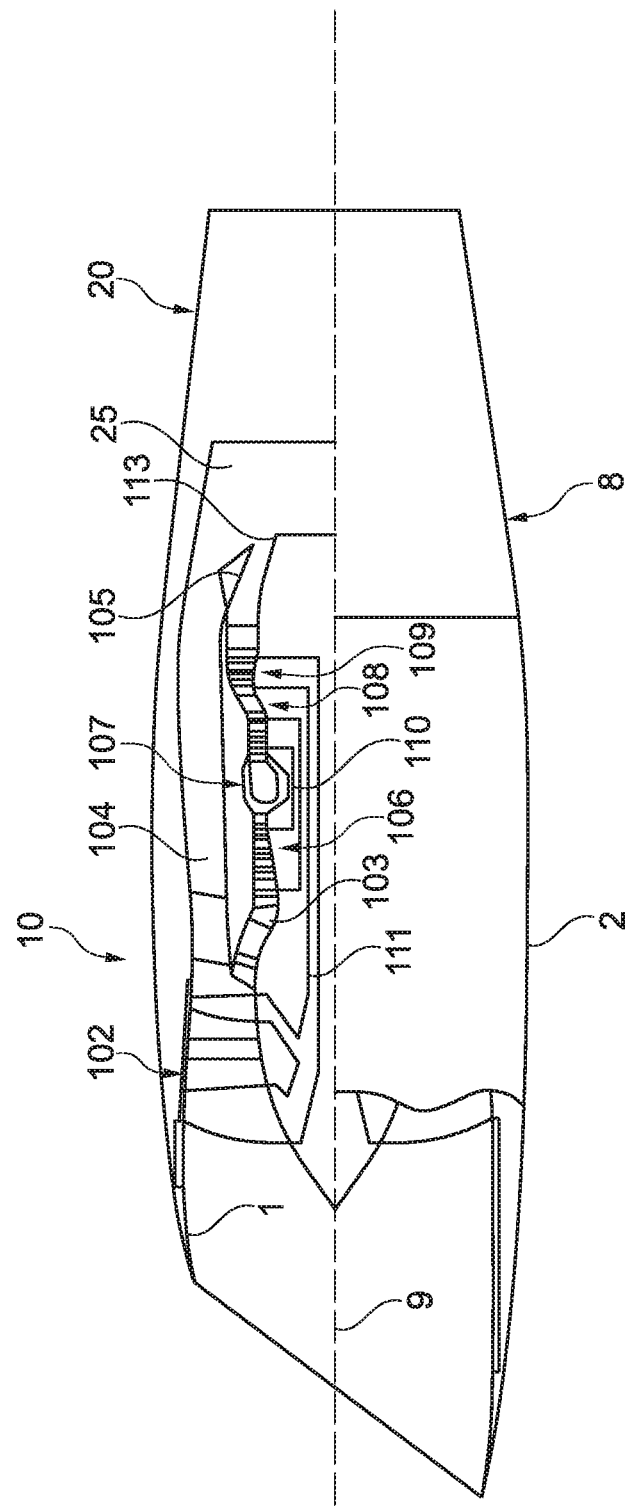
FIG. 1 is a schematic sectional side view of a supersonic gas turbine engine.

FIG. 1 shows a turbofan engine which is intended and suitable for use in a civil or military supersonic aircraft and, accordingly, is designed for operating conditions in the subsonic, transonic and supersonic ranges. However, it should be noted that the principles of this invention can also be implemented in a turbofan engine designed for subsonic operation only. The description of the invention in the context of an engine nacelle of an engine intended for a supersonic aircraft is therefore only to be understood as an example.

The turbofan engine 10 comprises an engine intake 1, a fan 102 which may be a multi-stage fan, a primary flow channel 103 which passes through a core engine, a secondary flow channel 104 which bypasses the core engine, a mixer 105 and a nozzle 20 in which a thrust reverser 8 can be integrated.

The turbofan engine 10 has a machine axis or engine centerline 9. The machine axis 9 defines an axial direction of the turbofan engine. A radial direction of the turbofan engine is perpendicular to the axial direction.

The core engine comprises a compressor 106, a combustion chamber 107 and a turbine 108, 109. In the example shown, the compressor comprises a high-pressure compressor 106. A low-pressure compressor is formed by the areas close to the hub of the fan 102. The turbine behind the combustion chamber 107 comprises a high-pressure turbine 108 and a low-pressure turbine 109. The high-pressure turbine 108 drives a high-pressure shaft 110 which connects the high-pressure turbine 108 with the high-pressure compressor 106. The low-pressure turbine 109 drives a low-pressure shaft 111 which connects the low-pressure turbine 109 with the multi-stage fan 102. According to an alternative design, the turbofan engine may also have an intermediate-pressure compressor, an intermediate-pressure turbine and an intermediate-pressure shaft. Furthermore, in an alternative design it can be provided that the fan 102 is coupled to the low-pressure shaft 111 via a reduction gearbox, e.g., a planetary gearbox.

The turbofan engine is arranged in an engine nacelle 2. The engine nacelle 2 may be connected to the aircraft fuselage via a pylon.

The engine intake 1 forms a supersonic air intake and is, therefore, designed and suitable for decelerating the incoming air to velocities below Ma 1.0. The engine inlet is beveled in FIG. 1, with the lower edge protruding from the upper edge, but other kinds of supersonic intakes may be implemented instead.

The flow channel through the fan 102 is divided behind the fan 102 into the primary flow channel 103 and the secondary flow channel 104. The secondary flow channel 104 is also referred to as the bypass channel.

Behind the core engine, the primary flow in the primary flow channel 103 and the secondary flow in the secondary flow channel 104 are mixed by the mixer 105. Furthermore, an outlet cone 113 is mounted behind the turbine in order to achieve desired cross-sections of the flow channel.

The rear area of the turbofan engine is formed by an integral nozzle 2, where the primary and secondary flows are mixed in the mixer 105 before being fed into the integral nozzle 2. The engine behind mixer 105 forms a flow channel 25, which extends through nozzle 2. Alternatively, separate nozzles can be provided for the primary flow channel 103 and the secondary flow channel 104 meaning that the flow through the secondary flow channel 104 has its own nozzle that is separate to and radially outside the core engine nozzle. One or both nozzles (whether mixed or split flow) may have a fixed or variable area.

In the context of this invention, an intake 1 is considered which—different to the example of a gas turbine engine shown in FIG. 1—is movable relative to the nacelle 2. In this respect, it is pointed out that, as the intake 1 is movable relative to the nacelle 2, the term "nacelle" in the context of the present invention does not encompass the intake but designates that part of the housing of the gas turbine engine that is located downstream of the translating intake 1. The nacelle 2, namely its downstream part, may form the nozzle or part of the nozzle of the gas turbine engine.

Figure 2:
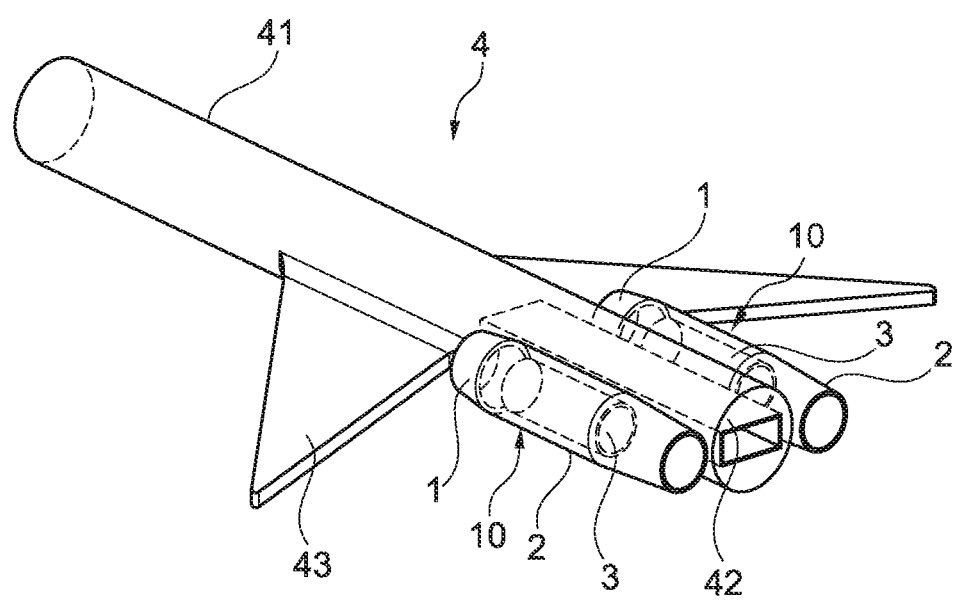
FIG. 2 is a schematic perspective view of an aircraft having two gas turbine engines attached to the fuselage, wherein the intake of each gas turbine is attached to the fuselage in a manner such that its position can be adjusted.

FIG. 2 shows in a schematic manner an embodiment of an aircraft that comprises gas turbine engines with translating intakes. The aircraft 4 comprises a fuselage 41 and wings 43. The fuselage 41 forms at its rear part an aircraft structure 42 to which two gas turbine engines 10 are attached. Each gas turbine engine 10 comprises an intake 1, a nacelle 2 and gas turbine engine components 3 located radially inside the nacelle 2. The gas turbine engine components 3 typically encompass a fan and a core engine with a compressor, a combustion chamber and a turbine, as discussed with respect to FIG. 1.

Figure 3:
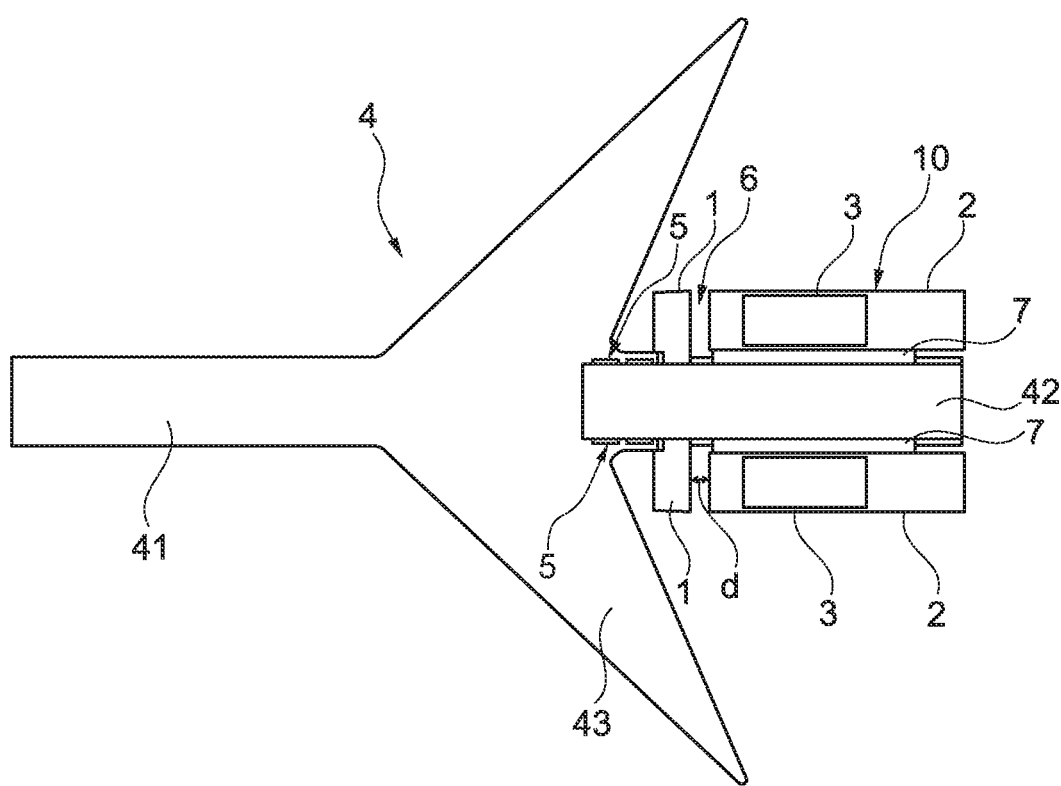
FIG. 3 is a top view on the aircraft of FIG. 2, wherein the intake of each gas turbine engine is in a deployed position in which the intake is located at an axial distance from the nacelle of the gas turbine engine.

FIG. 3 shows the aircraft of FIG. 1 in a top view. The nacelle 2 and the gas turbine engine components 3 are rigidly connected to the aircraft structure 42 of the fuselage 41 by means of pylons 7. The intake 1, on the other hand, is mounted to the aircraft structure 42, in a manner such that its position can be adjusted, by means of an actuating mechanism 5 that will be discussed in more detail with respect to FIGS. 4 and 5. The intake 1, by means of the actuating mechanism 5, can be translated in a linear movement in the forward and rearward axial direction of the gas turbine engine 10 with respect to the nacelle 2.

In particular, the intake 1 is movable between a stowed position as shown in FIG. 2 in which the intake 1 is located adjacent to the nacelle 2 and a deployed position as shown in FIG. 3 in which the intake 1 is located at an axial distance d to the nacelle 2. Accordingly, an axial gap 6 is present between the nacelle 2 and the intake 1 in the deployed position.

Figure 4:
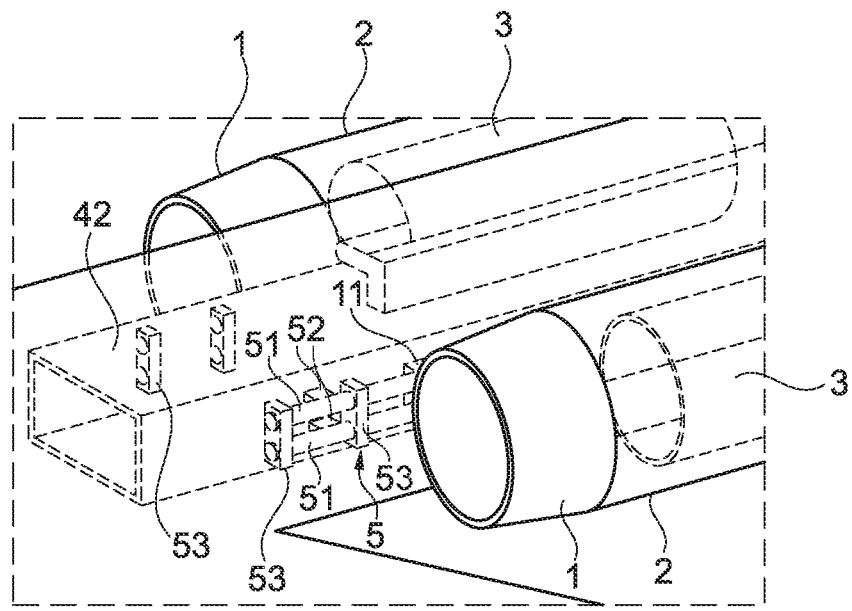
FIG. 4 is an enlarged perspective view of the gas turbine engines of FIGS. 2 and 3, wherein the intake of each gas turbine engine is in a stowed position in which the intake is located adjacent the nacelle of the gas turbine engine.
Figure 5:
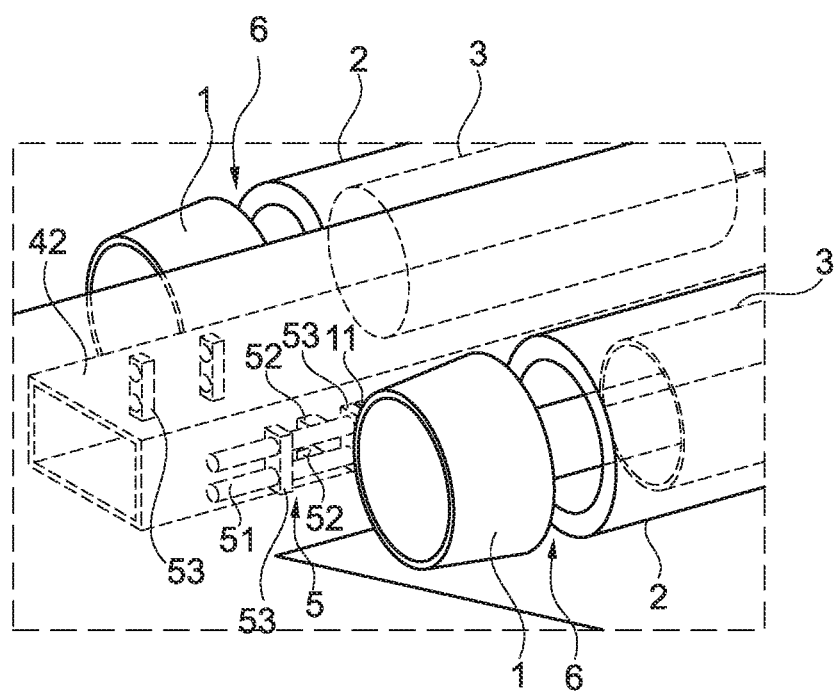
FIG. 5 is an enlarged perspective view of the gas turbine engines of FIGS. 2 and 3, wherein the intake of each gas turbine engine is in the deployed position, wherein movement of the intake from the stowed position of FIG. 4 to the deployed position is affected by means of actuators and guidance rails.

FIGS. 4 and 5 show in more detail an embodiment of an actuating mechanism 5 that is configured and provided to move the intake 1 relative to the aircraft structure 42 and the nacelle 2. The actuating mechanism 5 is connected to the aircraft structure 42 and, accordingly, is not arranged within the intake 1, such that a small cross-sectional area and slim design of the intake 1 may be implemented.

The actuating mechanism 5 comprises two actuators 52 and a sliding mechanism which is formed by two guidance rails 51. The actuators 52 are directly attached to the aircraft structure 42. The guidance rails 51 are connected to the aircraft structure 42 by means of holding elements 53 in a manner that allows them to be moved; they are slidable in the holding elements 53. The intake 1 is rigidly connected to the two guidance rails 51 through two respective fastening points 11.

When the guidance rails 51 are translated in the forward or rearward axial direction by means of the actuators 52, the intake 1 connected to the guidance rails 51 is moved in or against the axial direction together with the guidance rails 51.

FIG. 4 shows the stowed position. The intake 1 rests next to the nacelle 2 and there is no gap provided between the intake 1 and the nacelle 2. In order to provide for a consistent aerodynamic surface between the intake 1 and the nacelle 2 in the stowed position, the intake 1 and the nacelle 2 comprise corresponding structures and matching profiles at their end faces.

FIG. 5 shows the deployed position. The guidance rails 51 have been moved upstream relative to the aircraft structure 42 and, together with the guidance rails 51, the intake 1 has been moved away from the nacelle 2 such that an axial gap 6 is formed between the intake 1 and the nacelle 2.

The guidance rails 52 and the associated actuators 51 may each form a rack-and-pinion system for driving the guidance rail 52 by the actuator 51. However, any mechanism to linearly move a sliding mechanism by an actuator can be implemented.

It is pointed out that in FIGS. 4 and 5 the actuating mechanism 5 is shown for one gas turbine engine only. However, a similar actuating mechanism is implemented for the other gas turbine engine. Of this other actuating mechanism, only the holding elements 53 are shown.

In embodiments, the actuating mechanism 5 is designed such that the intake 1 may stop in one or multiple intermediate positions located between the deployed position and the stowed position, such that the amount of air entering the gas turbine engine 10 through the gap 6 can be adjusted precisely.

In an embodiment, the axial distance d between the intake 1 and the nacelle 2 is adjusted by means of the actuating mechanism 5 depending on the speed of the aircraft. In particular, the intake 1 may be moved into the deployed position shown in FIG. 5 at lower speeds of the aircraft and may be moved into the stowed position shown in FIG. 4 at higher speeds of the aircraft. In embodiments, the intake 1 is moved into the deployed position for takeoff and until the aircraft reaches a sufficient velocity. Above that speed, the intake 1 is moved into the stowed position. Depending on the gas turbine engine, the aircraft and the flight conditions the velocity of the aircraft at which the intake is moved into the stowed position may be different.

Figure 6:
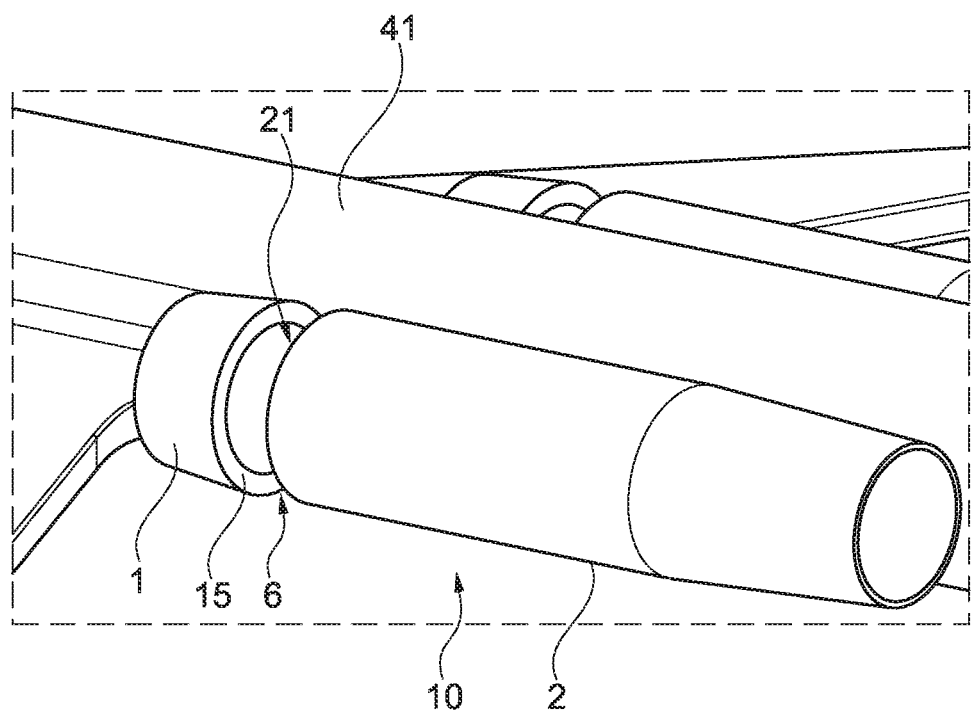
FIG. 6 is a perspective side view of an aircraft in accordance with FIGS. 1 to 5 showing the nacelle and the intake of the gas turbine engine, wherein the intake is in the deployed position.

FIG. 6 shows the nacelle 2 and the intake 1 in the deployed position, wherein an axial gap 6 is provided between the nacelle 2 and the intake 1. The mating face 15 of the intake 1 matches the profile of the end face 21 of the nacelle 2 such that, in the stowed position, the intake 1 and the nacelle 2 create a consistent aerodynamic surface that avoids the generation of turbulence.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. An aircraft comprising:
a gas turbine engine comprising an intake, a nacelle, and gas turbine engine components located radially inside the nacelle; and
an aircraft structure;
wherein the intake of the gas turbine engine is mounted to the aircraft structure in a manner such that an axial position of the intake is adjustable;
wherein the nacelle and the gas turbine engine components located radially inside the nacelle are rigidly mounted to the aircraft structure;
wherein the intake is movable between a stowed position in which the intake is located adjacent the nacelle and a deployed position in which the intake is located at an axial distance to the nacelle during in-flight operation, wherein in the deployed position an axial gap is present between the nacelle and the intake;
an actuating mechanism that comprises at least one actuator and a sliding mechanism, wherein the actuating mechanism is configured to move the intake relative to the aircraft structure;
wherein an external portion of the intake is connected to the sliding mechanism and wherein the sliding mechanism is movable in the forward and rearward axial direction via the actuator;
wherein the actuator and the sliding mechanism are attached to an internal portion of the aircraft structure externally of the intake and nacelle;
wherein the aircraft structure is a fuselage of the aircraft.

2. The aircraft of claim 1, wherein the aircraft is configured to move the intake into the deployed position during takeoff and at lower speeds of the aircraft.

3. The aircraft of claim 1, wherein the intake and the nacelle comprise corresponding structures at their end faces that face each other wherein, in the stowed position, the intake and the nacelle create a consistent aerodynamic surface.

4. The aircraft of claim 1, wherein the intake is movable to at least one intermediate position located between the stowed position and the deployed position.

5. The aircraft of claim 1, wherein the actuating mechanism is a linear actuating mechanism moving the sliding mechanism and the intake in a linear manner.

6. The aircraft of claim 1, wherein the intake is connected at a minimum of two mounting positions to the sliding mechanism.

7. The aircraft of claim 1, wherein the sliding mechanism comprises at least one guidance rail that is movable relative to the aircraft structure, wherein the intake is connected to the guidance rail and wherein the guidance rail is driven by the actuator.

8. The aircraft of claim 1, wherein the gas turbine engine comprises a central axis, wherein the intake is slidable with respect to the nacelle in and against the axial direction.

9. The aircraft of claim 1, wherein the components of the gas turbine engine located radially inside the nacelle comprise a fan and an engine core located downstream of the fan.

10. A gas turbine engine comprising:
an intake, a nacelle, and gas turbine engine components located radially inside the nacelle;
wherein the intake of the gas turbine engine is configured to be mounted to an aircraft structure in a manner such that a position of the intake is adjustable;
wherein the nacelle and the gas turbine engine components located radially inside the nacelle are configured to be rigidly mounted to the aircraft structure;
wherein the intake is movable between a stowed position in which the intake is located adjacent the nacelle and a deployed position in which the intake is located at an axial distance to the nacelle during in-flight operation, wherein in the deployed position, an axial gap is present between the nacelle and the intake;
an actuating mechanism that comprises at least one actuator and a sliding mechanism, wherein the actuating mechanism is configured to move the intake relative to the aircraft structure;
wherein an external portion of the intake is connected to the sliding mechanism and wherein the sliding mechanism is movable in the forward and rearward axial direction via the actuator;
wherein the actuator and the sliding mechanism are attached to an internal portion of the aircraft structure externally of the intake and nacelle;
wherein the aircraft structure is a fuselage of the aircraft.

11. A method for adjusting an input of air flowing into a gas turbine engine attached to an aircraft, the method comprising:
connecting an intake of the gas turbine engine to an aircraft structure in a manner that allows the intake to be moved from one position to another;
connecting a nacelle and gas turbine engine components located radially inside the nacelle in a rigid manner to the aircraft structure;
adjusting an axial distance between the intake and the nacelle by moving the intake relative to the aircraft structure between a stowed position in which the intake is located adjacent the nacelle and a deployed position in which the intake is located at an axial distance to the nacelle during in-flight operation, wherein in the deployed position an axial gap is present between the nacelle and the intake;
providing an actuating mechanism that comprises at least one actuator and a sliding mechanism, wherein the actuating mechanism is configured to move the intake relative to the aircraft structure;
providing that an external portion of the intake is connected to the sliding mechanism and wherein the sliding mechanism is movable in the forward and rearward axial direction via the actuator;
providing that the actuator and the sliding mechanism are attached to an internal portion of the aircraft structure externally of the intake and nacelle;
providing that the aircraft structure is a fuselage of the aircraft.

12. The method of claim 11, wherein the intake is moved in the deployed position at lower speeds and moved into the stowed position at higher speeds of the aircraft.

* * * * *